(12) United States Patent
Ozbaysal

(10) Patent No.: US 10,335,878 B2
(45) Date of Patent: Jul. 2, 2019

(54) NI—TI—CR NEAR TERNARY EUTECTIC ALLOY FOR GAS TURBINE COMPONENT REPAIR

(71) Applicant: Siemens Energy, Inc, Orlando, FL (US)

(72) Inventor: Kazim Ozbaysal, Charlotte, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 250 days.

(21) Appl. No.: 15/401,186

(22) Filed: Jan. 9, 2017

(65) Prior Publication Data

US 2017/0182575 A1 Jun. 29, 2017

Related U.S. Application Data

(62) Division of application No. 13/465,223, filed on Jun. 13, 2012, now Pat. No. 9,573,228.

(Continued)

(51) Int. Cl.
*B23K 1/00* (2006.01)
*B23K 1/20* (2006.01)
(Continued)

(52) U.S. Cl.
CPC ............ *B23K 1/0018* (2013.01); *B23K 1/206* (2013.01); *B23K 35/304* (2013.01); *B23K 35/3033* (2013.01); *C22C 19/055* (2013.01); *C22C 19/056* (2013.01); *C22F 1/10* (2013.01); *F01D 5/005* (2013.01); *F01D 5/12* (2013.01);
(Continued)

(58) Field of Classification Search
CPC .............. B23K 35/3033; B23K 35/304; C22C 19/055; C22C 19/056; C22F 1/10; F01D 5/005; F01D 5/12; F01D 9/02; F05D 2220/32; F05D 2230/23; F05D 2230/80; F05D 2300/175; F05D 2300/177; F05D 2300/701

See application file for complete search history.

(56) References Cited

U.S. PATENT DOCUMENTS

| | | | | |
|---|---|---|---|---|
| 6,027,584 A | * | 2/2000 | Jackson | B23K 35/304 148/427 |
| 6,520,401 B1 | * | 2/2003 | Miglietti | B23K 1/0018 228/194 |
| 2008/0017694 A1 | * | 1/2008 | Schnell | B23K 35/304 228/119 |

FOREIGN PATENT DOCUMENTS

| | | |
|---|---|---|
| CN | 1641072 A | 7/2005 |
| CN | 102021405 A | 4/2011 |
| WO | 2008091377 A2 | 7/2008 |

OTHER PUBLICATIONS

M.K. Thomas "Solidification and Strength Characteristics of Ni—Cr—Ti and Co—Cr—Mo eutectics" (Year: 1982).*

* cited by examiner

*Primary Examiner* — Jenny R Wu

(57) ABSTRACT

A ternary near eutectic alloy of Ni, Ti, Cr is described having a relatively low melting temperature of approximately 1230 deg. C. or less, suitable for fusing cracks in turbine blades and vanes without substantial risk of cracking during the repair process. Such an alloy is suitable for low temperature joining or repair of turbine blades since it contains the same components as typical turbine blades and vanes without foreign elements to lower the melting point of the repaired material or adversely affect the mechanical properties of the repaired component. Exclusion of boron eliminates the formation of brittle boron compounds, detrimental to the properties of the repair or seam.

2 Claims, 3 Drawing Sheets

Related U.S. Application Data

(60) Provisional application No. 61/555,113, filed on Nov. 3, 2011.

(51) Int. Cl.
| | |
|---|---|
| *F01D 9/02* | (2006.01) |
| *C22C 19/05* | (2006.01) |
| *F01D 5/00* | (2006.01) |
| *F01D 5/12* | (2006.01) |
| *B23K 35/30* | (2006.01) |
| *C22F 1/10* | (2006.01) |
| *B23K 101/00* | (2006.01) |

(52) U.S. Cl.
CPC .......... *F01D 9/02* (2013.01); *B23K 2101/001* (2018.08); *F05D 2220/32* (2013.01); *F05D 2230/23* (2013.01); *F05D 2230/80* (2013.01); *F05D 2300/175* (2013.01); *F05D 2300/177* (2013.01); *F05D 2300/701* (2013.01)

NI—TI—CR NEAR TERNARY EUTECTIC ALLOY FOR GAS TURBINE COMPONENT REPAIR

CROSS-REFERENCE TO RELATED APPLICATIONS

This application claims the benefit of U.S. patent application Ser. No. 13/495,223 filed on Jun. 13, 2012, which claims the benefit of U.S. Provisional Patent Application No. 61/555,113 filed Nov. 3, 2011, the disclosures of which are hereby incorporated by reference herein.

TECHNICAL FIELD

This invention relates to the repair of superalloy components, and in particular, to superalloy components used in gas turbines, and most particularly, to Ni—Ti—Cr near ternary eutectic alloys for effecting such repairs.

BACKGROUND

Superalloys are typically understood to be high-temperature materials which display excellent resistance to mechanical and chemical degradation of properties even as temperatures approach the melting points of the materials. Ni superalloys are based upon nickel (Ni) and typically contain significant amounts of numerous other elements such as chromium (Cr), aluminum (Al), titanium (Ti), tungsten (W), cobalt (Co), tantalum (Ta), carbon (C), among others. The high-temperature superalloys found early application in aircraft turbine engines. Since a higher operating temperature typically leads to increased fuel efficiency and lower carbon emissions, causing superalloys to find increasing uses in ground-bases turbine systems as well. For example, see *The Superalloys*, by Roger C. Reed, (Cambridge University Press, 2006, particularly Chapter 1. The entire contents of this reference is incorporated herein by reference for all purposes.

Thus, as superalloys are used in greater numbers of airborne and ground-based turbine systems, and operated at higher temperatures, increasing number of blades vanes and other components are subject to cracking and other forms of material degradation requiring repair. It is important that the repair of such turbine components be effectively carried out to result in repaired components having properties as close as possible to those of the original components.

The economic importance of superalloys has generated considerable research in their welding and repair. See, for example, *Welding Metallurgy and Weldability of Nickel-Base Alloys*, by J. N. DuPont, J. C. Lippold, Samuel D. Kiser (John Wiley & Sons, 2009), particularly Chapter 4. The entire contents of this reference is incorporated herein by reference for all purposes.

In spite of this considerable amount of research, problems still arise in the joining or repair of superalloy components. Typically, shortcomings of other approaches include cracking during or after repair, short service life of the repaired component, increased brittleness, among other problems. Thus, a need exists in the art for improved methods and materials for the repair of superalloy turbine components.

SUMMARY

The filler alloys described herein utilize a near ternary eutectic composition of Ni—Ti—Cr which enables repairs to be carried out at a relatively low temperature, thereby reducing or eliminating the problem of cracking during the repair process. Also, with some embodiments of the filler alloys described herein, solution heat treatment of the base material occurs at a temperature that also leads to homogenization of the repaired region. In addition, boron is not present in harmful amounts in the filler alloys described herein, eliminating thereby the problems of brittleness etc. often associated with the formation of brittle boron compounds.

In some embodiments of the present invention, the composition of the near ternary eutectic is adjusted to allow the homogenization of the repaired region to occur at the solution heat treat temperature of the component. Calculations performed with JMatPro-4.0 (from Sente Software Ltd., Surry Technology Centre, UK) indicate that the ternary alloy having a composition approximately as given in Formula-1:

$$\text{Ni}(x)\text{-Ti}(y)\text{-Cr}(z) \hspace{2cm} \text{Formula-1}$$

melts near 1175 deg. C. when x, y, z are chosen to be substantially in the following ranges (in weight percent):

$$55\% \leq x \leq 65\% \hspace{2cm} (1a)$$

$$15\% \leq y \leq 25\% \hspace{2cm} (1b)$$

$$15\% \leq z \leq 25\% \hspace{2cm} (1c)$$

The ranges given in (1a, 1b, 1c) and throughout this document are not intended to be fixed and firm limits, but rather to provide substantially accurate descriptions of the compositions, subject to modest adjustments in specific cases as may be determined by routine experimentation.

This alloy, Formula-1, is indicated by region 101 in FIG. 1. As an example with commercial applications, we have shown that Formula-1 has the capability to repair components made from alloy 247C.

Other embodiments employ mixtures of near ternary eutectic and base material to effect repair.

Accordingly and advantageously, these and other advantages are achieved in accordance with the present invention as described in detail below.

BRIEF DESCRIPTION OF THE DRAWINGS

FIG. 2 is an example of narrow gap brazing while FIG. 3 is an example of large gap brazing.

DETAILED DESCRIPTION

The present invention relates to a near ternary eutectic filler alloy of Ni+Cr+Ti for making high strength repair joints, typically for the joining and repair of gas turbine components.

Typical prior art filler alloys include boron (B) as a component of the filler alloy. This tends to reduce the mechanical properties and lifetime of the repaired component since B tends to form brittle borides with the elements typically found in gas turbine components. Cracking is also a problem with prior art weld filler materials both during and after the repair process.

The filler alloys described herein utilize a near ternary eutectic composition which enables repairs to be carried out at a relatively low temperature, thereby reducing or eliminating the problem of cracking during the repair process.

Also, with some embodiments of the filler alloys described herein, solution heat treatments are used for homogenization following repair. In addition, boron is not present in harmful amounts in the filler alloys described herein, eliminating thereby the problems of brittleness etc. often associated with the formation of brittle boron compounds.

In some embodiments of the present invention, the composition of the near ternary eutectic is adjusted so as to allow the homogenization of the repaired region to occur at the solution heat treat temperature of the component.

Figure 1:
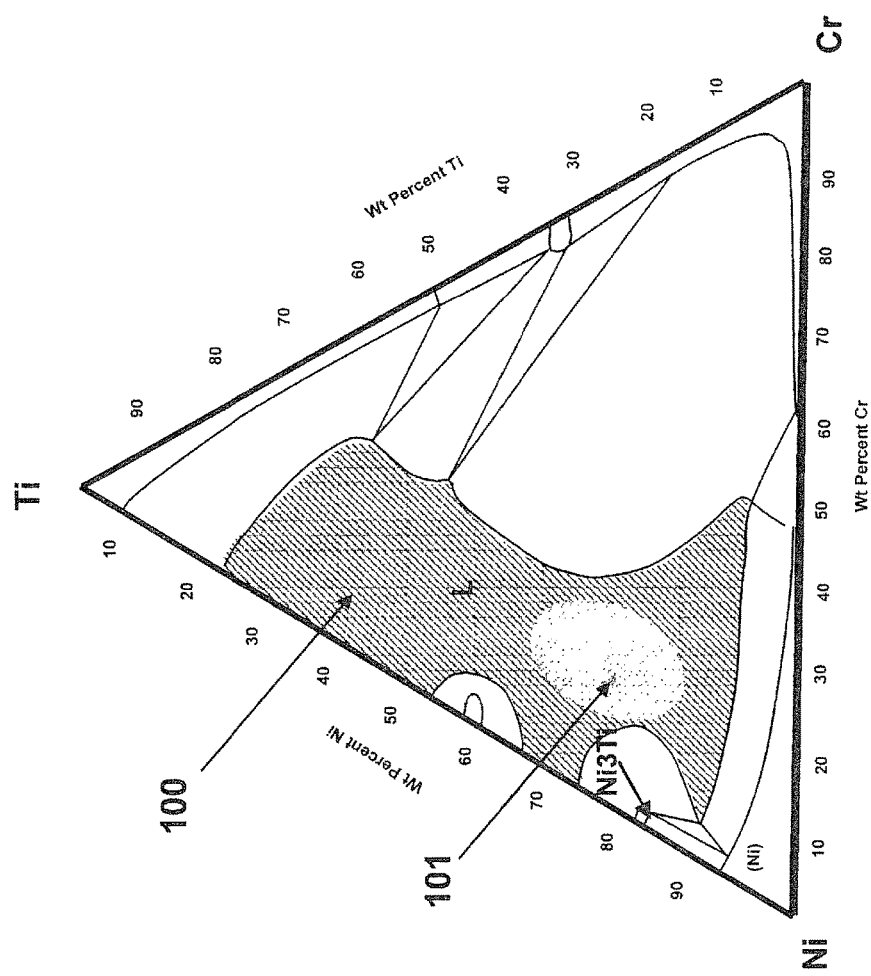
FIG. 1: Ternary phase diagram depicting Cr—Ni—Ti isothermal projection at 1277 deg. C.

FIG. 1 shows an isothermal section of a phase diagram for ternary Ni—Cr—Ti at 1277 deg. C. Liquid phases are indicated by region 101. Compositions of particular interest for the present alloy composition are indicated by region 100. These compositions are expected to be liquid at temperatures above about 1175 deg. C, and advantageous for the repair of turbine components. Thus, the favorable compositions are as given above in Formula 1:

$$Ni(x)-Ti(y)-Cr(z) \qquad \text{Formula-1}$$

With: 55%≤x≤65%; 15%≤y≤25%; 15%≤z≤25% melts near 1175 deg. C. This alloy, Formula-1, is indicated by region 100 on FIG. 1.

As an example with commercial applications, we have shown that Formula-1 has the capability to repair components made from alloy 247C.

Table-I shows the composition of the blade, alloy 247, the composition of the repaired joint (both given in weight percent) and the calculated difference after the repair, Delta. Table-I shows that the composition of the repaired joint is similar to the composition of the 247 base material. It is expected, however, that this will occur only in those cases (such as this example) in which the solution heat treat temperature substantially homogenizes the repair location.

Figure 2:
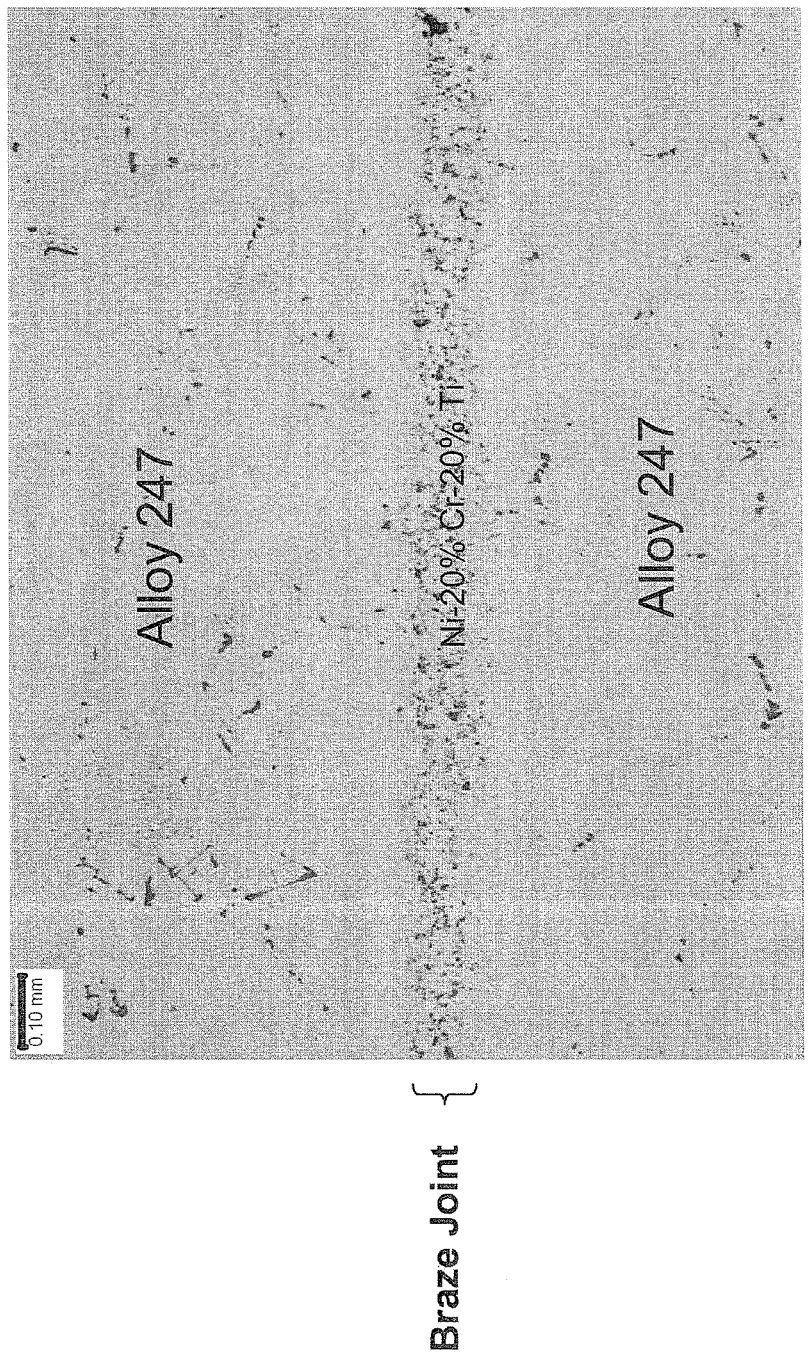
FIG. 2 and FIG. 3: Photomicrographs of representative braze joints employing materials and procedures described herein.
Figure 3:
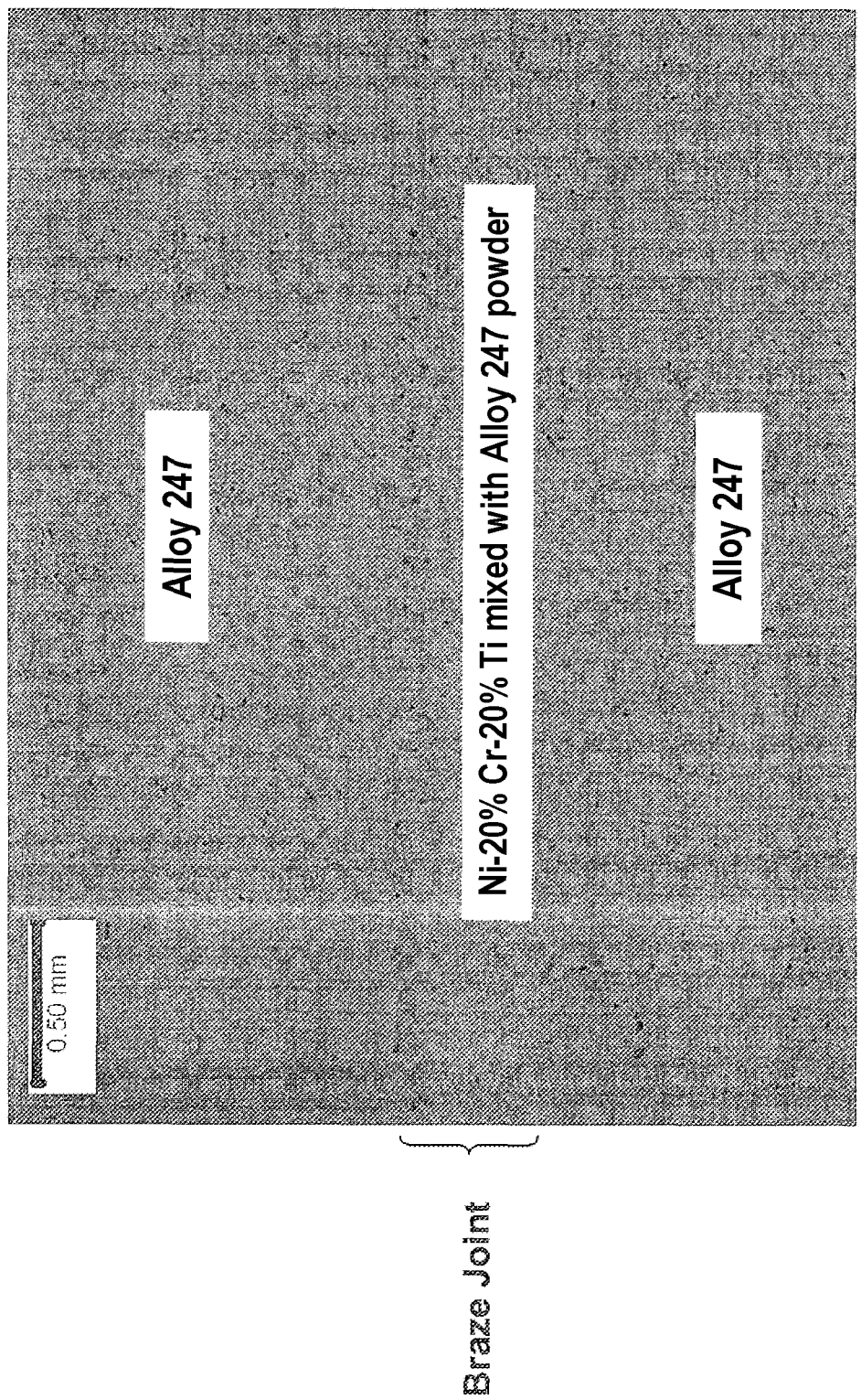

FIGS. 2 and 3 are photomicrographs of representative braze joints using the near tertiary eutectic of Formula-I with x=60%, y=20%, z=20%, mixed with alloy 247 powder, following solution treating at 1240 deg. C. for 2 hours in a vacuum furnace. The braze joint in FIG. 2 contained only near eutectic alloy representing narrow gap brazing. The braze joint in FIG. 3 contained a mixture of 247 powder and braze powder representing large gap braze.

In summary, the composition of Formula-1, with a calculated melting temperature in the range from about 1150 deg. C. to about 1230 deg. C. is shown to be an advantageous filler material, particularly for alloy 247 that is solution heat treated at 1230 deg. C. Therefore, when this Formula-1 filler material is applied to open cracks in alloy 247 components, it will melt and fill the cracks at an advantageous temperature. Furthermore, it is shown below that a 2 hour solution heat treatment of alloy 247 will homogenize the repaired region.

A typical repair process making use of the filler materials described herein proceeds as follows:

a) The repair area of the component is cleaned and filled with the near ternary eutectic filler as well as base material, generally in powder, wire or foil form.

b) The near ternary eutectic filler alloy has a melting temperature below the solution heat treatment temperature of the component being repaired.

c) The relative fractions of near ternary eutectic filler and base material added to the repair area is adjusted so as to respond to full homogenization after heat treatment.

d) The component having this mixture of near ternary eutectic filler and base material in the repair location is heat treated above the melting point of the near ternary eutectic so as to achieve full fusion.

e) The near ternary eutectic melts and its elements diffuse into the base material during the heat treatment operation due to differences in composition between the component undergoing repair and the base material.

f) The solution heat treatment step also serves as the homogenization treatment.

In contrast, typical welding processes may use the same composition of filler material but the higher temperatures involved (typically around 1450 deg. C.), cracking during cooling often occurs.

The specific examples considered above employed alloy 247, it is expected that the materials and processes described herein can be used with other alloys as well, typically alloys whose solution heat treat temperature is above about 1200 deg. C.

Although various embodiments which incorporate the teachings of the present invention have been shown and described in detail herein, those skilled in the art can readily devise many other varied embodiments that still incorporate these teachings.

TABLE I

| Comp | 247 | Repair* | Delta |
|---|---|---|---|
| Cr | 8 | 8.75 | 0.75 |
| Co | 9 | 7.92 | −1.08 |
| Ti | 0.6 | 4.17 | 3.57 |
| Al | 5.4 | 4.50 | −0.90 |
| W | 9.3 | 7.50 | −1.80 |
| Ta | 3.1 | 2.50 | −0.60 |
| C | 0.07 | 0.06 | −0.01 |
| Ni | 64.53 | 64.61 | 0.08 |

*100 gm 247 + 40 gm ternary powder

I claim:

1. A method for repairing or joining a gas turbine component comprising:
    a) cleaning the area of said component to be repaired and filling said area to be repaired with a mixture of filler material and base material;
    wherein said filler material has a melting temperature less than the solution heat treatment temperature of said base material; and
    wherein said mixture contains relative fractions of said filler material and said base material so that full homogenization is achieved after heat treatment of said component;
    b) solution heat treating said component and said mixture above the melting point of said filler material achieving thereby fusion and homogenization, wherein said filler is a ternary eutectic alloy comprising Ni, Ti, Cr, and wherein no boron is present in said alloy, wherein said filler has Ni in 60%, Ti in 20% and Cr in 20% by weight.

2. The method of claim 1, wherein said alloy is in the form of a foil.

* * * * *